(Model.) 3 Sheets—Sheet 1.
R. SCHULZ.
BRUSH.
No. 450,042. Patented Apr. 7, 1891.
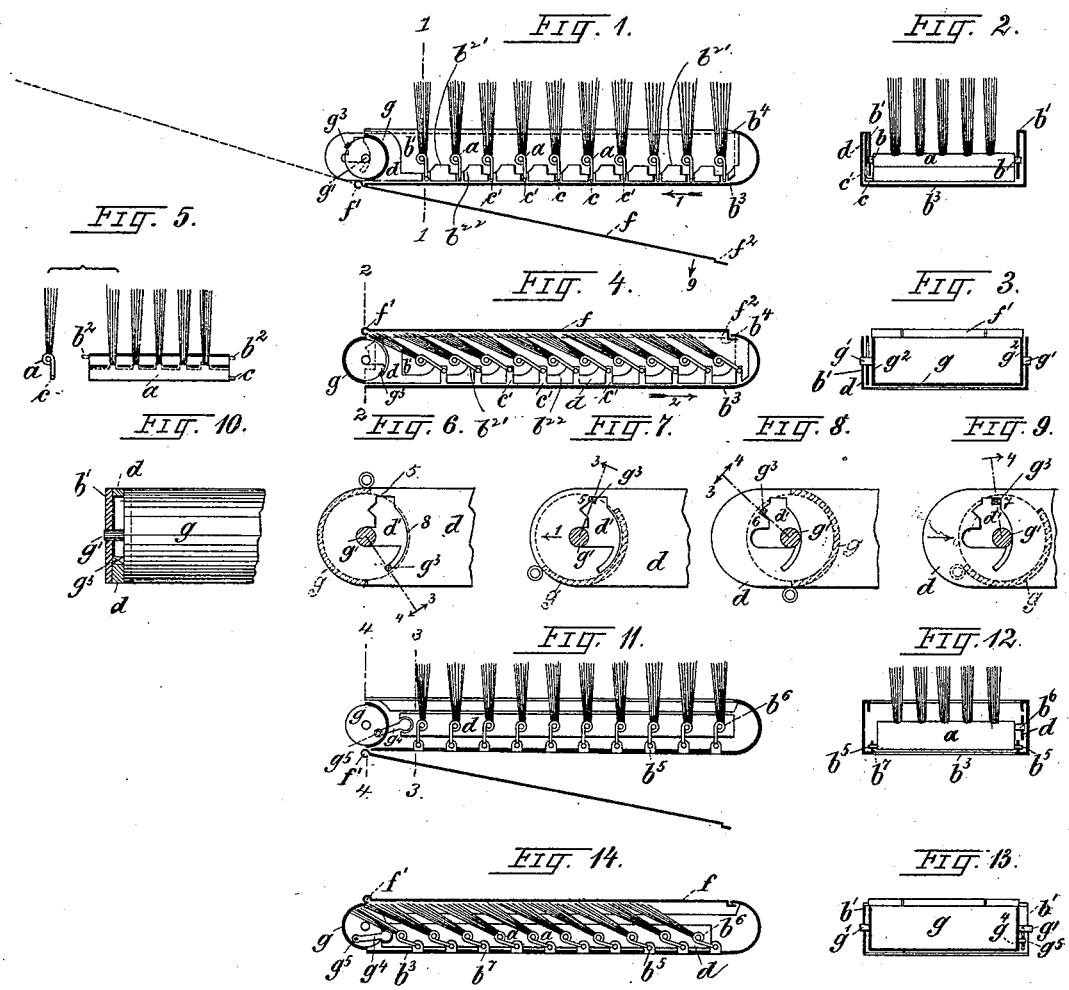
Witnesses.
J. Thomson Cross
Geo. M. Dowe
Inventor
Richard Schulz
per Henry Orth
Atty.

(Model.)
3 Sheets—Sheet 2.
R. SCHULZ.
BRUSH.
No. 450,042.
Patented Apr. 7, 1891.
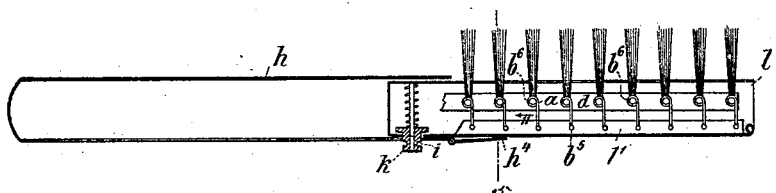
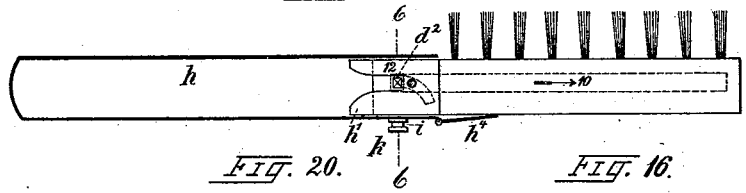
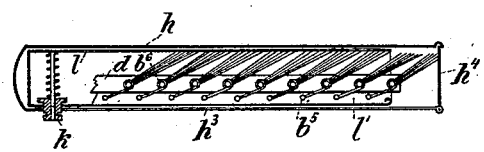
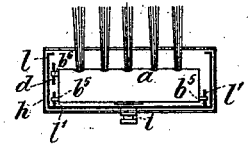
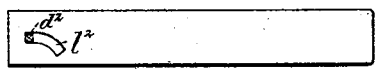
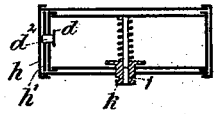
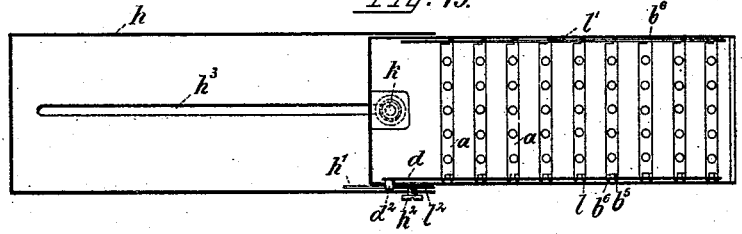
Witnesses
J Thomson Cross
Geo. M. Dove
Inventor
Richard Schulz
per Henry Orth
Atty.
THE NORRIS PETERS CO., PHOTO-LITHO., WASHINGTON, D. C.

(Model.)

R. SCHULZ.
BRUSH.

No. 450,042.  Patented Apr. 7, 1891.

3 Sheets—Sheet 3.

Witnesses.
Thomson Cross
Geo. M. Dow.

Inventor.
Richard Schulz
per Henry Orth
Atty.

THE NORRIS PETERS CO., PHOTO-LITHO., WASHINGTON, D. C.

UNITED STATES PATENT OFFICE.

RICHARD SCHULZ, OF BERLIN, GERMANY.

BRUSH.

SPECIFICATION forming part of Letters Patent No. 450,042, dated April 7, 1891.

Application filed July 18, 1889. Serial No. 317,868. (No model.) Patented in Germany April 30, 1889, No. 50,114, and in England May 22, 1889, No. 8,533.

*To all whom it may concern:*

Be it known that I, RICHARD SCHULZ, manufacturer, a subject of the King of Prussia, residing at 61 Sebastianstrasse, Berlin, Prussia, German Empire, have invented certain new and useful Improvements in Brushes, (for which I have obtained Letters Patent in the following countries: Germany, April 30, 1889, No. 50,114, and in Great Britain May 22, 1889, No. 8,533;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 26:
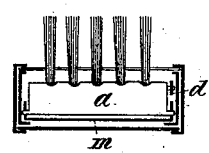
Figure 27:
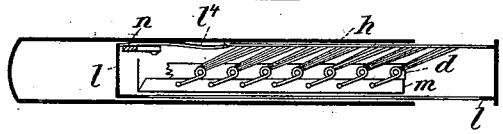
Figure 29:
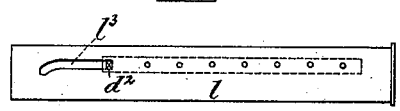
Figure 28:
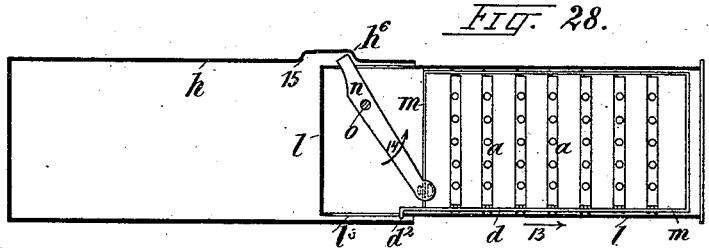
Figure 30:
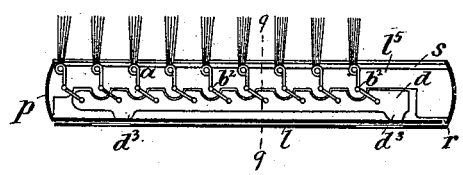
Figure 31:
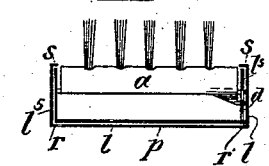
Figure 32:
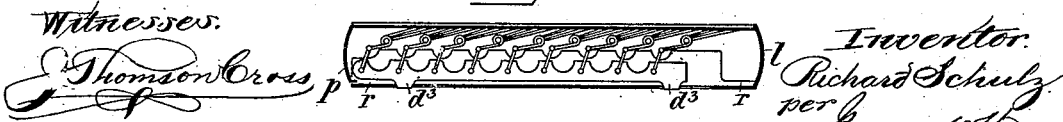
Figure 33:
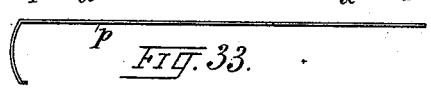

Figures 1 and 4 are longitudinal vertical sections of my improved folding brush, showing the same, respectively, ready for use and folded. Figs. 2 and 3 are sections on lines 1 1 and 2 2 of Fig. 4. Fig. 5 is a side and end elevation of one of the pivoted brush-bars. Figs. 6 to 10, inclusive, are detail views of a portion of the brush-case, illustrating the means for rocking the brush-bars, Figs. 11 to 14, inclusive, showing a modification in the means for actuating the brush-bars, Figs. 11 and 14 being sections similar to those shown in Figs. 1 and 4, respectively; and Figs. 12 and 13 are sections taken on lines 3 3 and 4 4 of Fig. 11. Figs. 15 to 21 show another modification in the construction of the brush, Figs. 15 and 20 being sections similar to those shown in Figs. 1 and 4. Figs. 16 and 18 are sections taken on lines 5 5 and 6 6, respectively, of Figs. 15 and 17, Fig. 17 being a part elevation and part section of the brush. Fig. 19 is a horizontal transverse section thereof, and Fig. 21 is a detail view. Figs. 22 to 33, inclusive, show still another modification in the construction of the brush and the means for actuating the brush-bars, Figs. 22, 25, and 30 being views similar to those shown in Figs. 15 and 1, respectively; Fig. 24, a view similar to Fig. 17; Figs. 27 and 32, views similar to Fig. 4; Fig. 28, a view similar to Fig. 19. Figs. 23, 26, and 31 are sections taken on lines 7 7, 8 8, and 9 9 of Figs. 22, 25, and 30, respectively; and Figs. 29 and 33 are detail views.

Folding brushes as heretofore constructed for use, generally as pocket-brushes, present inconveniences, in that they are not handy, in that the brush-case is usually very large relatively to the brush itself, and in that the brush is subjected to rapid wear, the folding of the brush-bundles being effected by the action of the case-cover thereon.

The object of this invention is to obviate these inconveniences; and it consists in structural features and combinations of parts, substantially as hereinafter described, and as set forth in the claims.

In my improved brush the bundles of bristles and their supports are so connected with the casing and its cover or sheathing as to fold within the casing when the latter is being closed or are brought into an erect position when said casing is opened, while the length of the supports for the bundles of bristles is in all cases equal or substantially equal to the width of the casing. The means employed for actuating the supports for the bundles of bristles and the mode of pivoting such supports within the brush-case may be greatly varied, as will hereinafter appear.

Referring more particularly to Figs. 1 to 10, inclusive, $b^3$ indicates the brush-case, and $a$ the bars or shafts to which the bundles of bristles are secured, said bars or shafts being formed of sheet metal bent to the shape shown more clearly in Fig. 5, the bundles of bristles being secured to the shaft in any well-known or suitable manner. The shafts $a$ are pivoted on pins $b$, projecting from the side walls $b'$ of the casing $b^3$, and said pivots or journals may be soldered or otherwise secured to said side walls, or they may be formed by stamping, the casing being preferably constructed of sheet metal. These journals fit into the cylindrical or tubular bent portion of the shaft $a$, as shown in Fig. 2; but it is obvious that the journals may be secured to the shaft itself, as shown at $b^2$, Fig. 5, and bearings provided in the side walls of the casing for such journals. Each of the shafts $a$ is further provided at one end with a journal or pin $c$, that extends into a slot $c'$ of an actuating bar or rod $d$. This bar has an endwise motion in a chamber formed between one of the side walls of the casing and an intermediate wall $b'$, secured to said side wall or formed integral therewith by bending a portion of said side wall over and inwardly, as shown in Fig. 2, said inner wall or partition serving not only to properly guide the actuating-bar, but for locking the brush-shafts $a$ into position, said wall or partition having a series of recesses $b^{21}$, the rear wall of which is vertical, while the forward wall is curvilinear. The horizontal wall of the recesses $b^{21}$ is at such an elevation from the bottom of the brush-casing as to be on a line with the like walls of the vertical slots $c'$ in the actuating-bar $d$, as shown in Fig. 4.

It will be readily seen that when the brushes are folded within the case, as in Fig. 4, the pin $c$ of the shafts $a$ lies at the upper end of the slot $c'$ and within the recess $b^{21}$; but when said bar $d$ is caused to move in the direction of the arrow 1, Fig. 1, the pin $c$ rides along the curvilinear front wall $b^{22}$ of the recess, moving downwardly until it has reached the under side of the partition or intermediate wall $b'$, thereby tilting the brush-shafts $a$ into the position shown in Fig. 1, with the bundles of bristles in a vertical direction for use, while if said bar $d$ is caused to move in the direction of arrow 2, Fig. 4, the shafts $a$ will be tilted so as to bring the bundles of bristles into a folded position, as shown in Fig. 4.

In order to elevate or lower the bundles of bristles without applying power directly thereto, thereby avoiding the wear resulting from such direct application of power, I operate the actuating-bar through the medium of the lid or cover $f$. This lid or cover $f$ is hinged, as shown at $f'$, to a semi-cylindrical end piece $g$, that closes one end of the brush-case and is pivotally connected with the side walls thereof. The outer end of the actuating-bar $d$ is also semi-cylindrical, and is provided with an irregular slot $d'$, into which projects a stud $g^3$, secured to the semi-cylindrical end piece $g$, said slot having the curved portion 8, in the end of which the stud $g^3$ lies when the brush-case is closed and the brush-shafts $a$ are tilted toward the left, as shown in Fig. 6.

If the lid $f$ is turned over after being unlocked from the case, the lid having the locking-lip $f^2$, that engages with the edge $b^4$ of the semi-cylindrical outer end of the brush-case $b^3$, the semi-cylindrical end piece $g$ will be revolved on its pivots $g'$, and the stud or pin $g^3$ thereof will travel along the curvilinear face 8 of the slot $d'$ (which face is a segment of a circle having the pivots $g'$ for the center) until said pin reaches the abutment or vertical shoulder 5, Fig. 7, of the slot $d'$ in the actuating-bar $d$. During this movement of the end piece and its pin no motion will be imparted to the actuating-bar $d$. A further rotation of the end piece and its pin will now impart a rectilinear motion to said actuating-bar to tilt the brush-shafts $a$ from left to right and erect the brushes; but this movement will not take place until the lid or cover has completely cleared the brush-case and is out of reach of the brushes, the pin moving from the shoulder 5 to the locking-shoulder 6, Fig. 8, the end piece $g$ having made one-half of a revolution on or with its pivots $g'$, and its position will have been reversed, as shown in Figs. 1 and 8, the cover $f$ being then in the position shown in said Fig. 1, so that the brush-case can be used with the greatest ease. A reverse movement of the cover $f$ or in the direction of arrow 9, Fig. 1, will cause said cover to impinge upon the projecting slotted end of the actuating-bar as soon as said cover reaches the position indicated by dotted lines in Fig. 1, during which movement of the cover $f$ the stud $g^3$ will have moved from the locking-shoulder 6 to the shoulder 7. A further rotation of the cover and end piece $g$ will move the actuating-bar inward, thereby tilting the brush-bars toward the left to fold the brushes within the case, when the cover will be about in a vertical position above the case, and the stud $g^3$ will have passed from the shoulder 7 to the curved face 8, and when said cover fully closes the case $b^3$ the said stud $g^3$ will have returned to its starting-point, as shown in Fig. 6, so that the cover at no time will come in contact with the brushes, said cover controlling the movements of the brush-shafts $a$.

As hereinbefore stated, the mode of pivoting the brush-shafts $a$ within the case and the means for tilting said shafts may be variously modified.

In Figs. 11 to 14, inclusive, I have shown the brush-shafts $a$, pivotally connected with the actuating-bar $d$ at one end, as shown at $b^6$, and to the casing $b^3$ through the medium of perforated ears $b^7$, projecting from the bottom thereof, the shafts $a$ being actuated by a crank-arm $g^4$, pivoted eccentrically at $g^5$ to the semi-cylindrical end piece $g$.

In Figs. 15 to 21 I have shown the brush-shafts $a$ pivotally connected with the actuating-bar $d$ at one end and with the casing through the medium of perforated strips or flanges $l'$, projecting from the bottom thereof; or said flanges may be formed by slitting the sheet metal and bending a portion thereof inwardly, as shown in Fig. 16. The actuating-bar $d$ has at its left end a stud or pin $d^2$, that projects into a slot $l^2$ in the side wall of the case $l$. (See Figs. 18 to 21.) Instead of a cover such as heretofore described, the brush-case is inclosed in an outer casing $h$, that has a slotted locking-piece $h'$ secured to its side wall by means of a screw $h^2$, the slot in said locking-piece lying in the path of the pin or stud $d^2$, so that when the brush-case $l$, with the bundles of brushes turned down, is withdrawn from the inclosing-casing $h$ and the stud or pin $d^2$ reaches the end of the slot in the locking-piece $h^2$ said stud will be held against further motion. If now the brush-case $l$ is drawn out to its full limit or in the direction of arrow 10, Fig. 17, the actuating-bar $d$ will be drawn in a reverse direction, (shown by arrow 11, Fig. 15,) imparting thereby a partial rotation to the brush-shafts and brushes, bringing the latter in a vertical position for use. To the inner end of the brush-case $l$ is secured a pin $k$, that carries a coiled spring and a flanged locking-button $k'$, which projects through a slot in casing $l$ and into a longitudinal slot $h^3$ in the outer casing. The tendency of the spring is to force the button outward; but the latter is held against the action of the spring by the edges of the slot $h^3$, which fit into an annular groove $i$, Figs. 15 and 16, formed in said button. At its outer end the slot $h^3$ is enlarged, so that when the brush-case is drawn out of its inclosing casing and the button reaches the enlarged end of slot $h^3$ it will be forced outwardly by its spring, so that the button will lie in the enlarged portion of said slot $h^3$, thus locking the brush-case to the inclosing casing $h$ and preventing the further outward motion of the said brush-casing. If the brush is to be pushed back into its inclosing casing, the button $k'$ is pushed in until the edges of the narrower portion of the slot will enter the groove $i$ in the button, when the brush-case can be moved inwardly. During this inward motion of the casing the inclined face 12, Fig. 17, of the slot in the locking-piece $h'$ will cause the actuating-bar to move from left to right, thus tilting the brushes, as shown in Fig. 20. After the brush-case has been fully pushed into the inclosing casing, the hinged end lid $h^4$ is turned up and locked to the inclosing casing, as shown in Fig. 20, by springing the same into the edge groove thereof.

Figure 22:
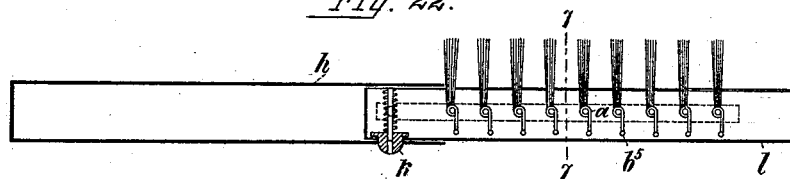
Figure 23:
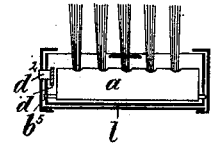
Figure 24:
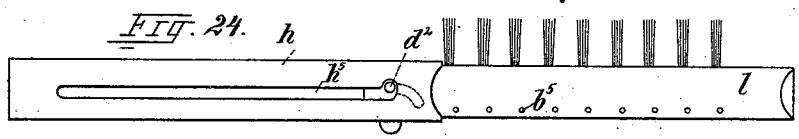
Figure 25:
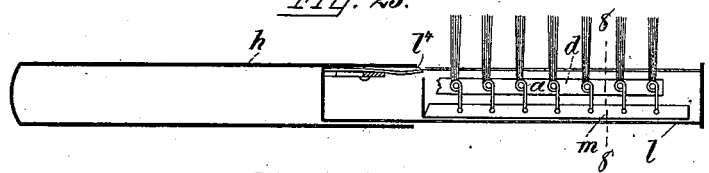

Figs. 22 to 24 show but a slight modification in the construction of the brush described in reference to Figs. 15 to 21. The locking-piece $h'$ is here dispensed with, a slot $h^5$ in the side wall of the inclosing casing $l$ being substituted therefor, and the brush-shafts are journaled directly to the side walls of the brush-casing $l$.

In the modified construction shown in Figs. 25 to 29 the brush-shafts are journaled in the turned-up edge of a casing $m$, that has an endwise motion in the brush-case $l$. When the brush-case $l$ is drawn out of its inclosing casing $h$, and before said brush-case is fully drawn out, one of the arms of a lever $n$, pivoted at $o$ to the brush-case, enters a recess $h^6$ in one of the side walls of the inclosing casing $h$, thereby causing said lever to revolve on its pivot $o$. The other arm of the lever $n$ is forked and straddles the rear wall of casing $m$, to which is imparted an accelerated forward motion relatively to the brush-case $l$ as soon as the lever-arm strikes the front wall of said recess $h^6$. Simultaneously therewith the pin $d^2$ on the actuating-bar $d$ reaches the end of the slot $l^3$ in the side wall of the brush-case $l$, whereby the motion of said bar, with the case, is arrested and the brush-shafts $a$ tilted to erect the brushes for use, a hook $l^4$, Figs. 25 and 27, locking the inclosing and brush cases together. On depressing the hook and pushing the brush-case $l$ into the inclosing casing $h$ the lever-arm strikes the inclined surface 15, so that the casing $m$ will receive a motion in a direction the reverse of that indicated by arrow 13, Fig. 28, whereby the actuating-bar $d$ is again actuated to turn the brushes down, as shown in Fig. 27, the pin $d^2$ moving down into the inclined portion of slot $l^3$, Fig. 29.

In the modification shown in Figs. 30 to 33 the actuating-bar $d$ is controlled by the sliding lid $p$ of the brush-case, which latter is provided with longitudinal grooves $s$ and $r$, respectively, into which the edges of the lid $p$ fit. By sliding the lid $p$ along the grooves $s$ the brush-case can be closed, as shown in Fig. 32, the brushes being at the same time turned down. On the contrary, by sliding the lid along the grooves $r$, Figs. 30 and 31, the end of said lid strikes the projections $d^3$ on the brush-actuating bar $d$ and displaces the same, whereby the brush-shafts are tilted and the brushes erected for use.

The brush-shafts are in this construction also provided with journals $b^2$, that have their bearings in the side walls of the brush-case $l$.

Other modifications in the construction and arrangement of the co-operating parts will readily suggest themselves to the skilled mechanic. One of the essential features of the invention consists, however, in that the brush-bundles are not directly acted upon to turn the same down or out of use, as has been the case heretofore, and whereby such brushes are injured and rapidly destroyed.

Having now described my invention, what I claim, and I desire to secure by Letters Patent, is—

1. In a folding brush, a brush-case, a series of brush-shafts journaled therein, and a rock-bar connected with the brush-shafts for rocking the same in their bearings, in combination with a cover for the case and a connection between the cover and rock-bar for positively operating said bar on opening and closing the brush-case, substantially as and for the purpose set forth.

2. In a folding brush, a brush-case, a series of brush-shafts journaled therein, and a rock-bar connected with the brush-shafts for rocking the same, in combination with a cover for the case, adapted to positively operate said bar, for the purpose set forth.

3. In a folding brush, a brush-case, brush-shafts journaled therein, said brush-case having a revoluble end wall, a rocking bar connected with the brush-shafts, and a connection between said bar and the revoluble end wall for imparting motion to the bar, substantially as and for the purposes specified.

4. In a folding brush, a brush-case, brush-shafts journaled therein, said brush-case having a revoluble end wall, a rocking bar connected with the brush-shafts, a connection between said bar and the revoluble end wall timed as to its operation relatively to the operation of the parts connected thereby for imparting motion to the bar, substantially as and for the purposes specified.

5. In a folding brush, a brush-case, brush-shafts journaled therein, said brush-case having a revoluble end wall, a rocking bar connected with the brush-shafts, a connection between the rocking bar and the revoluble end wall, and a cover for the brush-case, connected with said end wall and adapted to control the movements thereof and through the same the movements of the rocking bar, substantially as described.

6. In a folding brush, a brush-case, brush-shafts journaled therein, said brush-case having a revoluble end wall, a cover for the brush-case, hinged to said end wall and adapted to impart a partial rotation thereto on opening and closing the cover, a rocking bar connected with the brush-shafts, and a connection between said revoluble end wall and the bar for imparting motion to the latter when the end wall is partially revolved by the lid or cover, substantially as and for the purposes specified.

7. In a folding brush, a brush-case provided with a longitudinal groove along the upper and lower edges of its side walls and with slots in its bottom, a series of brush-shafts journaled in the case, and a rock-bar connected with said shafts for rocking the same, said bar having projections $d^3$ on its under side, in combination with a lid or cover adapted to impinge upon the projections on the rock-bar when inserted in the bottom groove to impart motion to said bar, substantially as and for the purpose set forth.

In testimony whereof I affix my signature in presence of two witnesses.

RICHARD SCHULZ.

Witnesses
GEORGE LOUBIER,
ADOLF DERWELNIO.